Nov. 1, 1927. 1,647,152
W. S. SEARLES
METALLIC TEMPLE FOR EYEGLASS MOUNTINGS
Filed Nov. 6, 1922
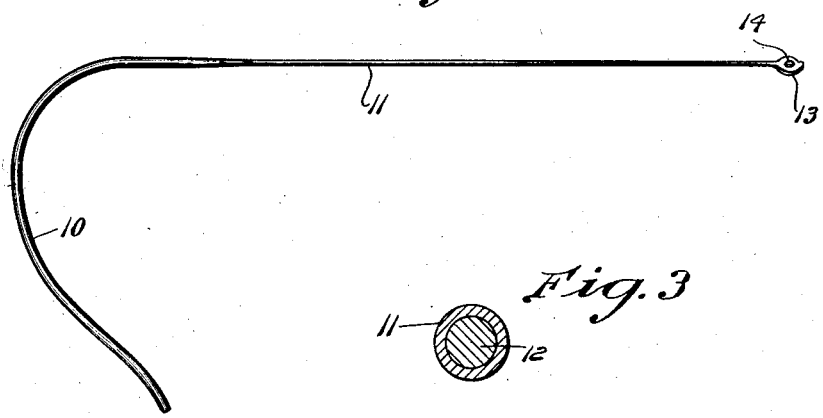
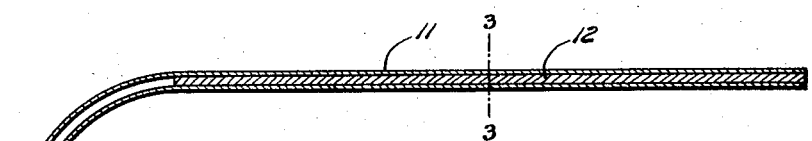
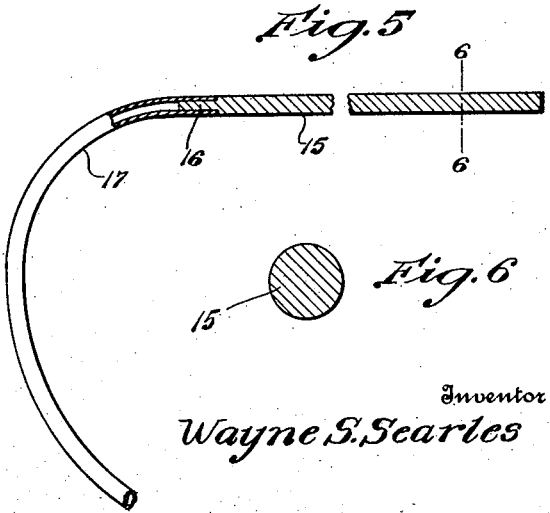
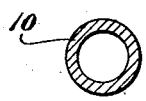
Inventor
Wayne S. Searles
By Howard E. Barlow
Attorney Patented Nov. 1, 1927.

1,647,152

UNITED STATES PATENT OFFICE.

WAYNE S. SEARLES, OF PROVIDENCE, RHODE ISLAND, ASSIGNOR TO UNIVERSAL OPTICAL CORPORATION. OF PROVIDENCE, RHODE ISLAND, A CORPORATION OF RHODE ISLAND.

METALLIC TEMPLE FOR EYEGLASS MOUNTINGS.

Application filed November 6, 1922. Serial No. 599,196.

This invention relates to an improved construction of metallic temple for eyeglass mountings, and has for its object to provide a temple of this character which is hollow and which is constructed either wholly or in part of metal tubing whereby the hook or ear-engaging portion of the temple may be formed of tubular wire which is relatively large in diameter yet very light in weight, and the shank portion of the temple may be reduced in size to render the same flexible, to readily bend and conform to the face of the wearer.

With these and other objects in view, the invention consists of certain novel features of construction, as will be more fully described, and particularly pointed out in the appended claim.

In the accompanying drawings:

Figure 1 is an enlarged perspective view of a finished temple showing the ear-engaging portion as formed of tubing and of a diameter considerably greater than the shank portion of the temple.

Figure 2 is a greatly enlarged sectional side elevation showing the temple as constructed of a metal tubing and its shank portion as being provided with a metal core or filling preparatory to being swaged or drawn down or reduced in diameter.

Figure 3 is an enlarged sectional end view on line 3—3 of Figure 2, showing the tube as being filled with a core.

Figure 4 is an enlarged sectional end view on line 4—4 of Figure 2, showing the open tubular ear-engaging portion of the temple.

Figure 5 is a side elevation partly in section showing the ear-engaging portion of the temple as being formed of tubing while the shank portion of the temple is formed of a solid wire secured to the tubing, which shank portion is subsequently drawn down cr reduced in diameter to render the same flexible.

Figure 6 is an enlarged section on line 6—6 of Figure 5.

It is found in practice of advantage to form the temple member for eyeglasses of tubular wire for several reasons, first, it permits the ear-engaging portion of the temple to be made of wire which is relatively large in diameter and at the same time very light in weight so as not to cut or irritate the tender flesh back of the ear of the wearer; second, by forming this portion of the temple of tubular wire, the larger sizes of wire are permitted to be used and at the same time the minimum amount of metal is employed as the walls of the tube may be made very thin, thereby reducing the cost of the material, which is an important item where the precious metals are employed. It is also found of advantage that where the whole temple is formed of tubing, to fill the shank portion of the temple with a base metal core to strengthen this portion of the temple and permit it to be drawn to a very small diameter to provide the required flexibility, and the following is a detailed description of one construction of temple by which these results may be accomplished:

With reference to the drawings, 10 designates the hook or ear-engaging portion of the temple, and 11 the shank portion of the temple both of which are preferably formed of tubular wire usually of the precious metals either of solid or plated with gold.

In the ordinary construction of a temple of this character, a piece of tubing of the desired length has one end bent into hook form to engage the back portion of the ear, the wire employed being of a size so large that it will not cut or abrade the tender flesh of the wearer and at the same time it is extremely light in weight and is adapted to be readily bent and shaped in adjusting the lenses to the faces of the different users.

The shank portion 11 of this temple is preferably filled with a core 12 of base metal which is preferably soldered and so united to the shell thus obtaining the maximum strength of this portion of the temple.

This shank portion is then drawn, swaged or otherwise reduced to render it very flexible so that it will readily yield and bend to conform to the face of the wearer, and on the end of this shank portion is formed a pivot lug or boss 13, pierced at 14 to receive a pivot pin (not shown), by which the temple is secured to the lens frames.

In some instances instead of forming the shank portion of the temple of tubing, I provide a length or section of solid wire 15, reduce and insert its inner end at 16 into the end of the tubular ear-engaging portion 17 after which this shank portion or section may be rolled or swaged down and reduced to the desired working diameter.

In either of the above constructions, in order to close the open end of the tubing, I provide a cap or plug 18 having an extension 19 adapted to fit into the end of the tubing and close the same and to also cover the base-metal inner portion of the tube when it is constructed of plated metal.

My improved construction of temple is extremely simple and practical and inexpensive when manufactured and by its use practical results are obtained which have advantages over temples made by other methods.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

A metallic temple comprising an elongated shank with one end extended into a hook-shaped ear-engaging portion, the ear-engaging portion being of hollow flexible sheet stock tubing and the elongated shank being of a diameter less than that of the hollow portion and having material in its center extending throughout its length to stiffen the same.

In testimony whereof I affix my signature.

WAYNE S. SEARLES.